T. Fisler,
Egg-Beater,

№ 53,965.            Patented Apr. 17, 1866.

Witnesses;
Joshua Hill
Silas H. Quint

Inventor;
Thomas Fisler

UNITED STATES PATENT OFFICE.

THOMAS FISLER, OF CAMDEN, NEW JERSEY.

IMPROVED PUNCH-MIXER AND EGG-BEATER.

Specification forming part of Letters Patent No. 53,965, dated April 17, 1866.

*To all whom it may concern:*

Be it known that I, THOMAS FISLER, of Camden, in the county of Camden and State of New Jersey, have invented a new and Improved Mixer, Strainer, and Beater for Mixing and Straining Drinks and Beating Eggs; and I do hereby declare that the following is a full and exact description thereof, reference being had to the accompanying drawings, and to the letters of reference marked thereon, in which—

Figure 1:
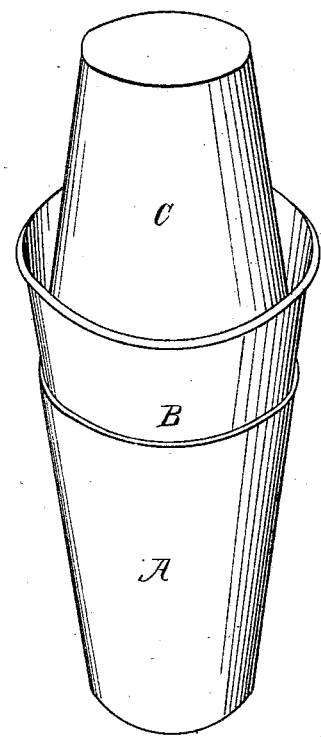
Figure 2:
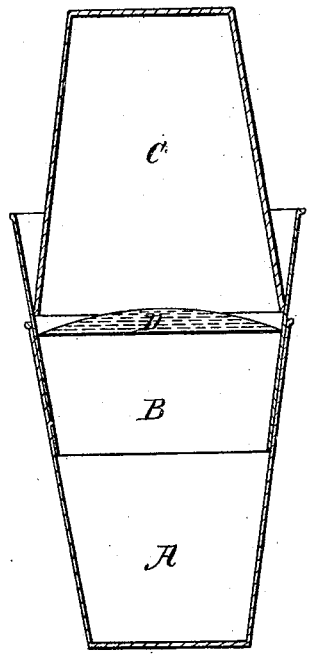

Figure 1 represents a perspective view; Fig. 2, a vertical section, and Fig. 3 a transverse section.

The nature of my invention consists in the combination of two cups and a tumbler or drinking-glass, one of the cups being open at both ends, and provided with a sieve or strainer, the whole combined together forming a complete device for mixing and straining drinks and for beating eggs.

To enable others skilled in the art to make and use my invention, I will proceed to describe its construction and operation.

Figure 3:
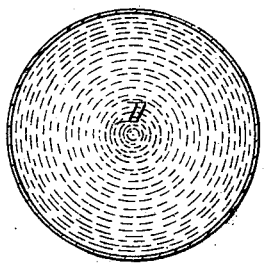

I construct two cups, conical in form, one of the cups being open at both ends. I make a sieve or strainer, D, as seen in Fig. 3. This sieve or strainer D is fitted to the inside of cup B, as seen in Fig. 2. Cup B is then placed in cup A, the end of cup B fitting tight against the inside of cup A, leaving a space between the bottom of cup A and the end of cup B. I then fit a tumbler or drinking-glass, C, in cup B, the outer edge of the glass fitting close against the inside of cup B near the sieve or strainer D, as seen in Fig. 2, the whole being arranged as seen in Fig. 1.

To operate my combined mixer, strainer, and beater, I put the ingredients to be mixed or beaten in cup A. I then put cup B inside of cup A. A tumbler or drinking-glass C is then put in cup B. I then place the forefinger on the end of glass C, clasping the remaining fingers and thumb around cup A, shaking the whole by the motion of the arm. When the contents are thoroughly mixed the glass C is removed and liquid strained through the sieve or strainer D into the glass C, leaving the ingredients not wanted in the liquid remaining in cup A.

If beating eggs, the operation and arrangement are the same, the eggs being forced rapidly through the sieve or strainer by being shaken. When the eggs are well beaten the glass C and cup B are both removed and the beaten eggs taken out of cup A.

What I claim as my invention, and desire to secure by Letters Patent, is—

The construction of cup B, with the sieve or strainer D attached, to be used in connection with cup A and glass C, the whole arranged substantially as set forth, and for the purposes specified.

THOMAS FISLER. [L. S.]

Witnesses:
  JOSHUA HILL,
  SILAS H. QUINT.